United States Patent

Rackovan et al.

Patent Number: 5,733,615
Date of Patent: Mar. 31, 1998

[54] IN-MOLD LABEL FILM AND METHOD

[75] Inventors: Mitchell J. Rackovan; Kushalkumar M. Baid; Gerald G. Popely, all of Mentor; Ronald V. Lloyd, Geneva, all of Ohio

[73] Assignee: Avery Dennison Corporation, Pasadena, Calif.

[21] Appl. No.: 446,899

[22] Filed: May 17, 1995

Related U.S. Application Data

[63] Continuation of Ser. No. 942,511, Sep. 9, 1992, Pat. No. 5,435,963, and a continuation-in-part of Ser. No. 756,556, Sep. 9, 1991, Pat. No. 5,242,650.

[51] Int. Cl.$^6$ ................................................. B29C 49/24
[52] U.S. Cl. .............. 428/35.7; 428/307.3; 428/307.7; 428/315.5
[58] Field of Search ................ 428/35.7, 307.3, 428/307.7, 315.5

[56] References Cited

U.S. PATENT DOCUMENTS

| | | | |
|---|---|---|---|
| 3,380,868 | 4/1968 | Moser | 264/235.8 |
| 3,758,661 | 9/1973 | Yamamoto et al. | 264/235.8 |
| 4,393,115 | 7/1983 | Yoshii et al. | 428/323 |
| 4,479,770 | 10/1984 | Slat et al. | 425/503 |
| 4,501,797 | 2/1985 | Super et al. | 428/349 |
| 4,601,926 | 7/1986 | Jabarin et al. | 428/35 |
| 4,713,273 | 12/1987 | Freedman | 428/40 |
| 4,758,396 | 7/1988 | Crass et al. | 264/235.8 |
| 4,837,075 | 6/1989 | Dudley | 428/220 |
| 4,883,697 | 11/1989 | Dornbusch et al. | 428/35.7 |
| 4,886,698 | 12/1989 | Purdy | 428/213 |
| 4,892,689 | 1/1990 | VanCappellen et al. | 264/235.8 |
| 4,892,779 | 1/1990 | Leatherman et al. | 428/220 |
| 4,904,324 | 2/1990 | Heider | 156/214 |
| 4,986,866 | 1/1991 | Ohba et al. | 156/220 |
| 5,026,592 | 6/1991 | Janocha et al. | 428/204 |
| 5,032,344 | 7/1991 | Kaminski | 264/509 |
| 5,073,435 | 12/1991 | Eyraud et al. | 428/215 |
| 5,076,977 | 12/1991 | Maier et al. | 264/235.8 |
| 5,126,197 | 6/1992 | Schinkel et al. | 428/349 |
| 5,152,946 | 10/1992 | Gillette | 264/235.8 |
| 5,308,693 | 5/1994 | Ryle et al. | 428/307.3 |

FOREIGN PATENT DOCUMENTS

| | | |
|---|---|---|
| 2012357 | 3/1990 | Canada . |
| 2-217223 | 8/1990 | Japan . |
| 2201681 | 9/1988 | United Kingdom . |

OTHER PUBLICATIONS

Opticite Label Films – Printing; Dow Chemical U.S.A. Films Group, Form No. 500-1087-1085, pp. 1–16.

*Primary Examiner*—Charles Nold
*Attorney, Agent, or Firm*—Renner, Otto, Boisselle & Sklar

[57] ABSTRACT

An oriented polymeric in-mold label film comprises a hot-stretched, annealed, linerless self-wound film lamina and has a face layer for printing and a base layer which includes a heat-activatable adhesive. The heat-shrinkability of the film is balanced thickness-wise to minimize curl and allow the film to be printed in conventional label-printing presses. An antistat may be included only in the charge for the base layer which includes the heat-activatable adhesive. In the manufacture of labelled blow-molded containers, sheets and labels formed from the film may be handled at high speeds while maintaining accurate registration and dimensional and positional integrity even in the absence of any reinforcing backing, yet the labels perform well on deformable containers such as shampoo bottles.

10 Claims, 3 Drawing Sheets

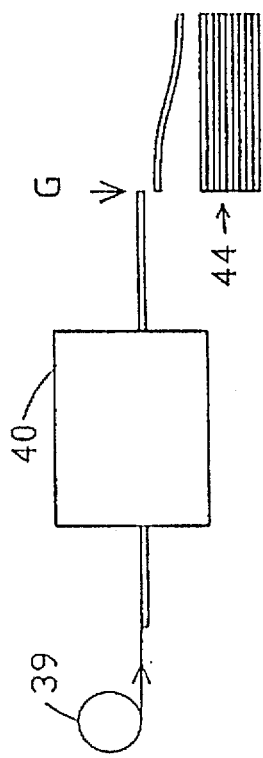
FIG. 3
FIG. 1
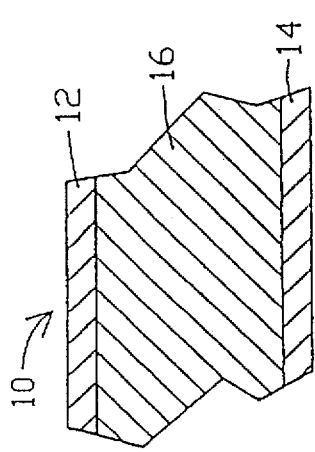
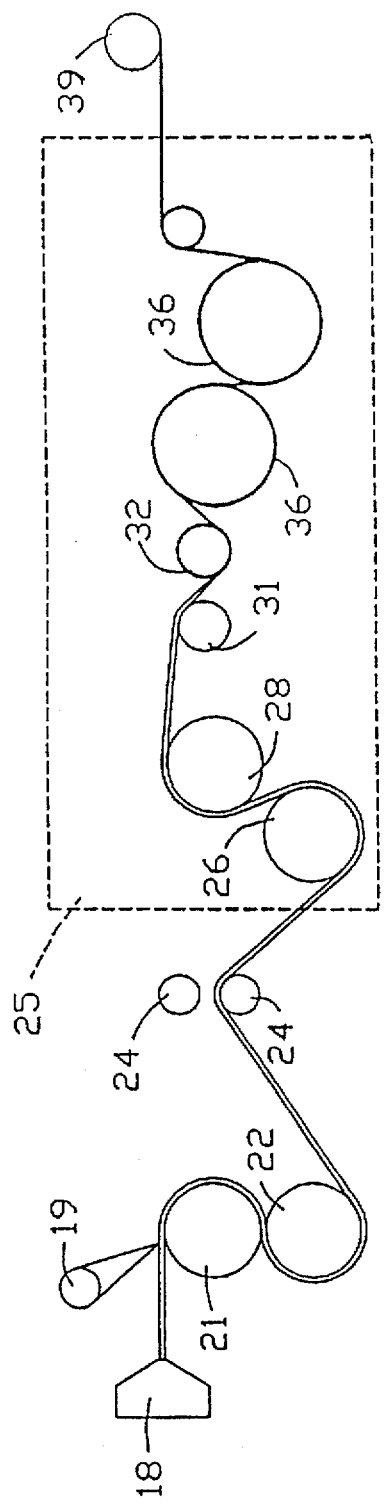
FIG. 2

IN-MOLD LABEL FILM AND METHOD

This is a continuation of application Ser. No. 07/942,511, filed Sep. 9, 1992, now U.S. Pat. No. 5,435,963 which is a continuation-in-part of application Ser. No. 07/756,556, filed Sep. 9, 1991, now U.S. Pat. No. 5,242,650.

This invention relates to in-mold labelling, using in-mold labels of the kind adapted to label blow-molded plastic containers. Labelling methods and articles of this kind are referred to as "in-mold" because the labels are held in place within the mold which forms the container during the container-forming step.

The invention particularly applies to in-mold labelling using polymeric labels, rather than using paper or paper-like labels. Polymeric labels offer many aesthetic and functional advantages over paper labels in the labelling of containers made by blow-molding plastic resins, such as high density polyethylene (HDPE). When a plastic container such as a HDPE squeeze bottle is used to package a product such as a hair shampoo, a package using a polymeric label is generally more appealing to consumers than a package using a paper label. In many applications the use of polymeric labels is required for reasons of appearance, handling, performance, moisture-resistance, conformability, durability and compatibility with the container to be labelled. Polymeric labels also enable clear or substantially transparent labels with only the label indicia being visible to the consumer.

In-mold labelling has significant advantages over methods commonly used in the past to label plastic containers with polymeric labels. The most common of these previous methods involve the use of liner-carried pressure-sensitive adhesive labels, or liner-carried heat-activatable adhesive labels. To produce the liner-carried labels, a laminating step is performed to sandwich a layer of adhesive between a web of label stock and a web of silicone-coated paper which is to function as a carrier or release liner, the label stock is printed, the ink is dried by heating elements or ultraviolet radiation (which also generates heat in the form of infrared), separate labels are cut from the label stock by passing the combination through a rotary-die or flat-bed cutting station, and the matrix of waste or trim label stock (and corresponding excess adhesive) surrounding the formed labels is stripped and discarded or recycled. What remains is a succession of individual labels releasably carried on the release liner.

In such earlier methods using carrier-supported polymeric labels, the paper or paper-like carrier or release liner may be relied on to provide dimensional stability to the relatively stretchy and deformable polymeric stock during printing of the labels and ink-drying under heat or ultraviolet, and during die-cutting of the labels and other manipulations which may subject the label stock or labels to mechanical and/or thermal stress on the high-speed printing or labelling lines. This use of the liner to provide dimensional stability avoids distortion of the label stock or labels and resulting interference with continuous high-quality production.

In such earlier methods, the labelling of the plastic containers is separate from the manufacture of the containers themselves. At the labelling station, the release liner on which the labels are releasably carried is drawn backwardly around a peel-back edge, thereby deploying the labels one after the other for application to the already-formed plastic containers. The cost of the release liner used in such earlier methods is a significant part of the total material cost associated with labelling, and may even approach the cost of the label stock itself. Therefore, the use of release liner involves a considerable economic cost. Furthermore the liner becomes scrap with little or no reclaim value as soon as it has been employed to dispense the labels. The need to dispose of unreclaimed scrap represents an ecological cost.

The matrix of waste or trim label stock involved in such prior methods also involves economic and ecological costs to the extent that the trim (which includes not only label stock but also adhesive) cannot be fully recycled. Even if the trim can be recycled to some extent, the costs of material handling and avoiding contamination incident to recycling also involve real economic and environmental costs.

In respect of paper labels, in-mold labelling has been widely practiced for some time. In respect of polymeric labels, in-mold labelling has been proposed as an alternative to the prior methods mentioned above in which release liner or carrier must be used. In-mold labelling using polymeric labels would avoid any use of release liner or carrier, and therefore would avoid the material and ecological costs associated with carrier and matrix disposal or attempted recycling. In in-mold labelling with polymeric labels, self-supported or free-film polymeric label stock (i.e., linerless polymeric stock) would be combined with heat-activatable adhesive, printed, die-cut and then arranged for deployment, as by being magazine-loaded as a series or stack of linerless labels, or by other means. The polymeric labels would then be sequentially deployed on the molding surface of a blow mold to be bonded onto successive hot workpieces as the workpieces (extruded parisons) are blown and expand against the molding surface and activate the heat-activatable adhesive.

Despite the advantages of in-mold labelling over liner-carried labelling, the commercially successful accomplishment of in-mold labelling with polymeric labels has been inhibited by several problems that are not encountered in in-mold labelling using paper labels. One is a lack of an acceptable degree of compatibility with conventional printing presses. The printing of label stock in conventional printing presses used in the label industry subjects the stock to considerable mechanical and thermal stresses incident to the training of the stock through the press and the drying of the ink. Paper stock relatively easily resists these stresses, whether or not the stock is combined with a liner. Also when liner-carried polymeric stock is printed, the dimensional stability of the paper carrier can be relied on to maintain the dimensional integrity of the polymeric stock which tends to stretch and deform under heat. However, there can be no such reliance when free-film polymeric label stock suitable for in-mold labelling is printed. But unless in-mold labelling products and methods are compatible with the use of such conventional printing presses, the threat of obsoleting existing presses presents a strong economic obstacle to wide acceptance of in-mold labelling in the packaging industry.

For in-mold labelling with paper labels, a method for die-cutting printed linerless paper label stock into labels and arranging the individual die-cut labels for deployment in the mold involves sheeting the printed label stock, stacking the sheets, forming stacks of individual labels from the stacked sheets with punch dies, and magazine-loading the stacks of individual labels, all done while maintaining proper positioning and registration. The inherent dimensional stability and stiffness of the paper aids in the accomplishment of this process. But labelling with polymeric stock using a similar sequence presents still another problem inhibiting the use of in-mold labelling with polymeric labels—that of meeting the requirements relating to physical manipulation of the work in process. One requirement is that the linerless printed sheeted polymeric stock be capable of being stacked layer-by-layer in registration so that the die-cutting is accurate. Another requirement is that the individual linerless labels dispense one-by-one in a reliable manner from the magazines and not flutter or deform as they are whipped into position in the mold by high-speed transfer means.

The linerless stock and individual labels must meet these requirements, but must also be flexible enough to continue to conform to molded containers to which they are adhered despite flexing or squeezing of those containers.

Another problem is that accumulation of static charges must be prevented, since their presence interferes with handling and will prevent accurate stacking and die cutting. The use of antistat agents is known, but their use must not interfere with printing, molding, and label adhesion. The topical application of antistat agents on the face of the label stock after it is printed but prior to sheeting is a possibility but is an expensive and cumbersome step.

One example of a recent proposal for in-mold labelling with polymeric labels is found in U.S. Pat. No. 4,837,075 to Dudley. In this patent, polymeric label stock in the form of a multilayer coextrudate (including a layer of heat-activatable adhesive as one of the coextruded layers) is provided which is intended to stand up to handling by high-speed automated equipment during the in-mold labelling procedure. However, Dudley does not address the problem of providing and processing free-film label stock through a conventional label printing press in such a way as to avoid distortion. While he does recognize the importance of avoiding wrinkling or folding during handling by high speed automated equipment, he does not address how to accomplish the same in a manner compatible with the use of conventional printing presses. Nor does he address the problem of eliminating static charges without adversely affecting printing.

THE PRESENT INVENTION

The present invention overcomes the problems discussed above. The invention contemplates combining a plurality of at least two laminae of film-forming resin to form an oriented polymeric in-mold label film, one of the laminae including a heat-activatable adhesive. The laminae may comprise coextruded layers which are processed together to form the label film, or the laminae may be separately formed laminae and/or lamina which may be combined before, during or after orienting of the film. The film is preferably uniaxially stretched and thereby uniaxially oriented in the machine direction. However, it is contemplated that the film may be stretched in both the machine and cross directions to be thereby biaxially oriented. In such case, the degree of stretch in the machine direction should exceed that in the cross direction so as to give a greater degree of stretch (and stiffness) in the machine direction. The invention involves the concepts, alone or in combination, of (1) hot-stretching or orienting and annealing or heat-setting the coextruded label film or one or more of the label film laminae prior to printing of the stock (and without activating the adhesive even though the temperature of activation of the adhesive is generally lower than the heating temperatures associated with hot-stretching and annealing), (2) thickness-wise balancing of the heat-shrinkability of the extruded layers or laminae so as to minimize curling, and (3) providing an antistat agent in the charge for the adhesive-containing layer or lamina.

In a first embodiment, the label film is coextruded and then hot-stretched and annealed. In a second embodiment, non-adhesive laminae or layers of the label film are separately formed and combined with the adhesive-containing layer or lamina before or after hot-stretching and annealing. Unless otherwise indicated by the context of the disclosure, the label film characteristics and preferred properties are applicable to the label films of the first and second embodiments.

The invention will be more fully understood from the following more detailed description, taken together with the accompanying drawings, which are highly schematic or diagrammatic and in which FIG. 1 diagrammatically illustrates a coextruded in-mold label film contemplated by the invention;

FIG. 2 is a sketch illustrating a coextruding, hot-stretching and annealing line used in the method of the invention;

FIG. 3 is a diagrammatic representation of a printing, drying, sheeting and stacking line used in the method of the invention;

Figure 8:
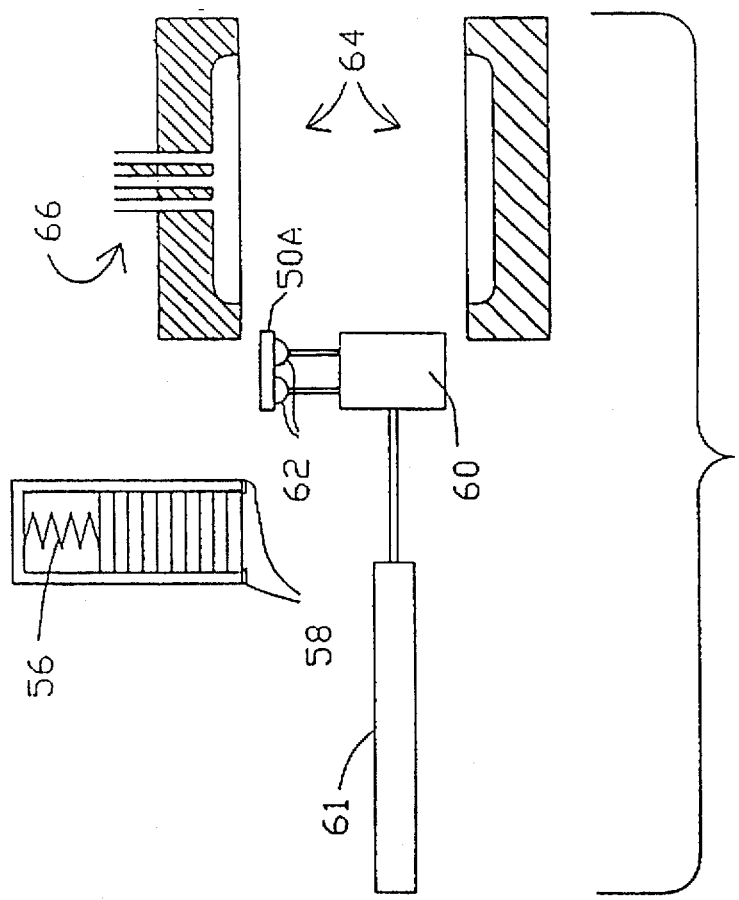
Figure 9:
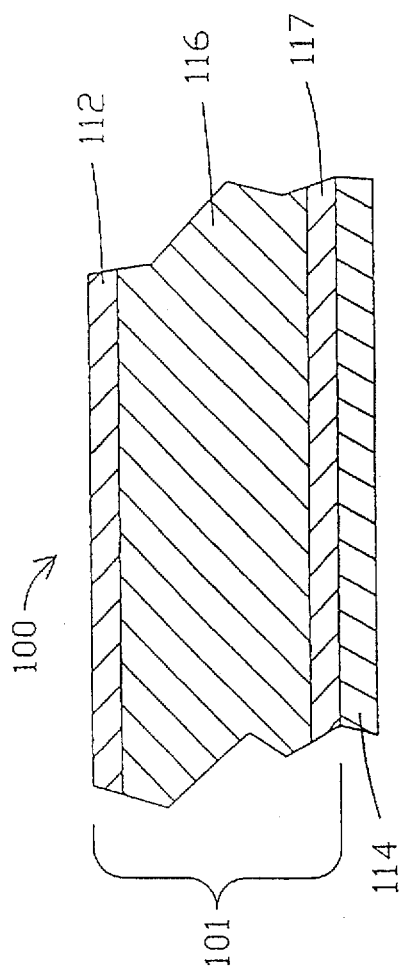
Figure 10:
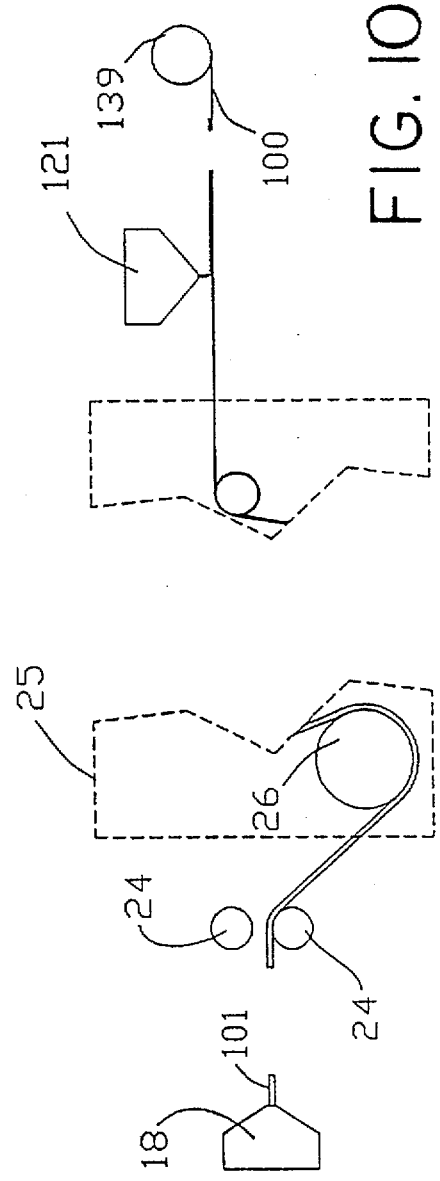

FIGS. 4–7 diagrammatically illustrate the punch-cutting of in-mold labels into individual stacks of labels in one means of practicing the invention;

FIG. 8 diagrammatically illustrates the use of the stacked labels in a molding operation;

FIG. 9 diagrammatically illustrates a second embodiment of an in-mold label film having at least one non-coextruded layer; and FIG. 10 is a fragmentary view similar to FIG. 2 showing extrusion coating of the non-coextruded layer of the in-mold label film of the second embodiment.

The label film 10 shown in FIG. 1 is a coextrusion consisting of a top or face layer 12, adhesive-containing or base layer 14 which includes a heat-activatable adhesive, and a central or core layer 16. The charges for the several layers are prepared for extrusion through the multifeed coextrusion die 18 as illustrated in FIG. 2. In the particular example described, the total thickness of the film as it leaves the casting station is about 20 mils.

As is typical with the kinds of polymeric resins and adhesives useful in the practice of the invention, the physical properties of the in-mold label film material are enhanced by hot-stretching and annealing. Hot-stretching is performed at a temperature equal to or above the softening temperature of the film and provides film orientation. Such temperature may exceed the activation or softening temperature of the adhesive. Annealing may similarly involve a processing temperature exceeding the adhesive activation temperature. The in-mold label film material should be annealed at a temperature sufficiently above the expected service temperature to avoid shrinking, relaxing or any distortion of the film which may interfere with the in-mold labelling process. The annealing temperature of the film material is therefore equal to or higher than the temperature at which the heat-activated adhesive is eventually to be activated by contact with the workpieces. In hot-stretching and annealing in the practice of the invention, the extrudate is trained through a series of relatively hot and cool rolls which contact the extrudate to thereby impart heat to and remove heat from the extrudate under time-temperature-direction conditions established by line speed, roll temperature, roll size, and side of contact. According to one important aspect of the invention, the time-temperature-direction conditions are controlled so as to heat at least a majority of the thickness of the extrudate to above its softening temperature prior to stretching without activating the adhesive to an extent that there is sticking of the adhesive to any of the series of heated and cooled rolls that contact the adhesive, and such conditions are also controlled so as to heat at least a majority of the thickness of the extrudate to its annealing temperature following stretching again without activating the adhesive to an extent that there is sticking of the adhesive to any of the series of rolls. This can be successfully accomplished despite the annealing temperature and possibly the softening temperature being equal to or higher than the temperature at which the hot workpieces contact the adhesive to activate it.

In accordance with these concepts, in a particular example of the method of the invention, the extrusion die is maintained at 400 degrees F. The extruded film is cast "adhesive side up" (i.e. with layer 14 on the top side and layer 12 on the bottom) onto a casting roll 21 which is maintained at 100 degrees F. and is provided with an air knife 19. The film continues around the casting roll and then passes to the chill roll 22 which is maintained at 70 degrees F. The film continues around the chill roll, trains through the rolls 24, and enters the machine direction orientation unit (MDO unit) 25. The film is moved at 15 feet per minute past all these rolls.

Within the MDO unit, the film is stretched and stiffened in the machine direction. The film is passed around a first pre-heat roll 26 and then around a second pre-heat roll 28. Both these rolls are maintained at 215 degrees F. and at this point the film continues to move at 15 feet per minute. Although at least a substantial portion of the thickness of the film is heated above its softening temperature so that the hot-stretching operation can be successfully accomplished, the time-temperature relationships are such that the heat-activatable adhesive contained within the adhesive-containing layer is not activated, even though the pre-heat rolls 26 and 28 are at a temperatures above the activation temperature of the heat-activatable adhesive. In the particular example described, that activation temperature must be about 200 degrees F. or less, since it must be low enough so at the time the labels are applied in the blow-mold, good adhesion is attained when the layer 14 is contacted by a parison at 200 degrees F. After leaving the second preheat roll 28, the stock tracks on the slow draw roll 31, still moving at 15 feet per minute. The stock then is pulled to the fast draw roll 32 which advances the stock at the rate of 75 feet per minute. Therefore, in the particular example described, the stock is stretched fivefold and is drawn down to about one-fifth its original thickness of 20 mils, or to about 4 mils. Stretch ratios of from 2 to 1 to 8 to 1 may be useful in different circumstances, but a ratio between about 4 to 1 and 6 to 1 is presently preferred. A midway range extends from about 3 to 1 to about 7 to 1. In the particular example described, the draw rolls 31 and 32 are both maintained at 225 degrees F.

In the particular example described, the stock now continues on its way at the rate of 75 feet per minute. As it leaves the pull-roll pair 31, 32, the stretched stock is subject to severe shrinkage if it is heated while under little or no mechanical constraint. The plastic stock is said to have a "memory" of its original length to which it tends to return when heated. The stock is cured or annealed to remove this tendency by applying heat to the tensioned stock at the annealing roll 36 which, in the particular example described, is maintained at 240 degrees F. It is to be noted that since the adhesive side is remote from the roll or "up," it does not directly contact the annealing roll 36 and is therefore not directly subjected to the elevated temperature of that roll. The stock then passes directly to the chill roll 38. The roll 38 is maintained at a temperature of 140 degrees F. and is directly contacted by the adhesive-containing layer of the stock. As the stock passes the rolls 36 and 38, time, temperature and side of contact all play a part in avoiding activation of the heat-activatable adhesive. After leaving the chill roll 38 at the completion of the hot stretch operation, the stock may be taken up as a self-wound roll 39. The roll 39 may be conveniently transported and stored where, as is usually the case, the labels as such are manufactured at a different site than that at which the label stock is manufactured.

Such uniaxial hot-stretching of the stock substantially increases stiffness in the machine direction but leaves the stock relatively flexible in the cross direction. As indicated above, it is also contemplated to use unbalanced biaxial stretching of the stock to achieve a satisfactory stiffness differential between the machine and cross directions, with the degrees of stretching and stiffness in the machine direction exceeding those in the cross direction. Whether the stretching is biaxial or uniaxial, that is, whether there is little (relatively) or no stretching in the cross direction, the degree of stretching in the machine direction exceeds that in the cross direction so that the stock is substantially stiffened in the machine direction and remains relatively flexible in the cross direction. Therefore the stock, whether uniaxially or biaxially stretched, may be referred to as having a machine direction stiffness differential. To date, increased stiffness in the machine direction has tended to provide improved labelling manufacture/performance results and no upper limit has been determined. A presently preferred range of stiffness in the machine direction is 40 to 130 Gurley. The cross-direction stiffness tends to be about half or slightly more than half the machine-direction stiffness, say 20 to 65. Particularly good results have been obtained with film materials having a machine direction Gurley in the range of 45 to 120 and a cross direction Gurley in the range of 20 to 60. Gurley stiffness is measured in milligrams using the test method designated as TAPPI T543PM-84.

Uniaxial hot-stretching and annealing are also important to the development of in-mold label film tensile properties necessary to withstand the mechanical and thermal stresses of conventional printing techniques of the type used in processing paper labels. The stretched and annealed film should have a tensile modulus greater than about 65,000 psi and an elongation at break of less than about 950%. Tensile properties including elongation and modulus are measured using the method set forth in ASTM D882.

Preferably, the total thickness of the hot coextrudate is about 20 mils, making a total thickness of about 4 mils following hot-stretching. In a presently preferred construction, the face or top layer 12 and the adhesive-containing or base layer 14 each comprise about 10 percent of the total thickness of the hot-stretched film, so that the central layer comprises about 80 percent of the thickness. Alternately, one or both of the face and base layers may be relatively thicker than the central layer.

In an example for white (opaque) labels, the layer compositions by weight percentages are:

EXAMPLE 1

| Top | polypropylene homopolymer | 50 |
|---|---|---|
| | ethylene-vinyl acetate copolymer | 50 |
| Central | polypropylene homopolymer | 70 |
| | ethylene-vinyl acetate copolymer | 15 |
| | titanium dioxide concentrate | 15 |
| Base | heat-activatable adhesive | 25 |
| | antistat | 5 |
| | polypropylene homopolymer | 25 |
| | ethylene-vinyl acetate copolymer | 45 |

The different polymer constituents of the various layers comprise physical blends of the indicated polymers with blending being provided in the pellet feed to the extruder and the extrusion process. The titanium dioxide concentrate is itself a blend of 50% polypropylene homopolymer and 50% titanium dioxide by weight. The concentrate is available in pellet form for convenience of addition to the extrusion feed.

In an example for clear labels, the layer compositions by weight percentages are:

EXAMPLE 2

| Top | polypropylene homopolymer | 50 |
|---|---|---|
| | ethylene-vinyl acetate copolymer | 50 |
| Central | random polypropylene copolymer | 60 |
| | ethylene-vinyl acetate copolymer | 40 |
| Base | heat-activatable adhesive | 25 |
| | polypropylene homopolymer | 25 |
| | ethylene-vinyl acetate copolymer | 45 |
| | antistat | 5 |

The random polypropylene copolymer of the central layer or core contains about 3 to 5% polyethylene by weight. The white label stock is slightly stiffer than the clear label stock. This is believed to be due to the stiffening effect of the titanium dioxide. The stiffness of the clear label stock may be increased by increasing the proportion of the polypropylene to the relatively less stiff ethylene-vinyl acetate ("EVA") or by substituting polypropylene homopolymer for the inherently less stiff polypropylene copolymer. In the following Example 3, the core layer is modified to attain a stiffness similar to that of Example 1.

EXAMPLE 3

| Top | polypropylene homopolymer | 50 |
|---|---|---|
| | ethylene-vinyl acetate copolymer | 50 |
| Central | polypropylene homopolymer | 85 |
| | ethylene-vinyl acetate copolymer | 15 |
| Base | heat-activatable adhesive | 25 |
| | polypropylene homopolymer | 25 |
| | ethylene-vinyl acetate copolymer | 45 |
| | antistat | 5 |

EXAMPLE 4

Example 4 is prepared by extrusion of the composition of Example 3 with a thickness of about 22.5 mils to result in a total film thickness of about 4.5 mils after hot-stretching. The ratio of the relative thicknesses of the layers of the film of Example 4 is similar to that of Examples 1–3.

Suitable film-forming polymers for use in the films of the invention are available from a number of commercial sources. The polypropylene homopolymer and copolymer resin materials used herein are sold by Shell Chemical Company under the designations DX 5A97 and 6C20 respectively. The DX 5A97 resin has a melt flow rate of 3.9 g/10 min. (ASTM D1238L), a density of 903 kg/m$^3$ and a flexural or flex modulus of 1,590 MPa (ASTM D790A). The 6C20 resin has a melt flow rate of 1.9 g/10 min. (ASTM D1238L), a density of 895 kg/m$^3$ and a flexural modulus of 806 MPa (ASTM D790A). The ethylene-vinyl acetate copolymer is sold by Quantum Chemical Corp. under the designation UE 631-04. The UE 631-04 resin has a melt flow rate of 2.5 g/10 min. (ASTM 1238E), a density of 940 kg/m$^3$ and a vinyl acetate content of 19% by weight.

The heat-activatable adhesive is a proprietary product sold by H. B. Fuller of Blue Ash, Ohio under product number HM727, and comprises ethylene-vinyl acetate copolymer ("EVA"), polyethylene waxes and a tackifier effective to accomplish adhesion to HDPE. The adhesive is itself far too "watery" or low in viscosity to be successfully extruded, but blends well with the EVA. The EVA stiffens up the extrudate, but is too sticky to process following extrusion, because it tends to stick to processing rolls with which it comes into contact while it is warm so as to damage the adhesive layer or laminate. The addition of polypropylene gives the extrudate excellent heat stability for hot-stretching and other processing. The addition of polypropylene also controls and moderates tackiness so as to make it possible and practical to process the extrudate film according to the concept of controlling time-temperature-direction conditions so as to avoid sticking to the rolls even though activation temperature of the adhesive is below glass transition and annealing temperatures. At the same time, the reduction of tackiness effected by the polypropylene does not interfere with excellent adhesion of the film to a plastic container of HDPE, for example. The proportions of EVA and polypropylene may be varied to accommodate processing variations.

The antistat is incorporated in the adhesive-containing or base layer charge and uniformly blended therewith. The amount of antistat used may be varied for particular formulations and processing conditions, the 5% amount used herein being typical. The antistat is efficiently used since it may be added to the adhesive or base layer charge only. Thus, the antistat addition to the base layer charge only provides specificity and efficiency of use without the disadvantages of a topically applied antistat. In certain applications, it may be advantageous to also include the antistat in the central layer charge as well as the base layer charge, or in the central layer charge only.

In the particular examples described, the antistat used is sold by Hoechst Celanese under product number E1956 and is of the type that when added in bulk blooms to the surface and dissipates electric charges by hydrophilic action which attracts extremely minute amounts of ambient moisture. By adding the antistat to the adhesive layer only, collection of moisture at the face layer which may interfere with the label printing process is avoided. Most surprising, it has been found that moisture collected at the adhesive layer surface does not interfere with adhesion of the label to the container in the in-mold labelling process. It is believed that the moisture is vaporized or dissipated by the elevated molding service temperatures, but in such small quantities as to not interfere with adhesion.

In the following examples, the base layers comprise a blend of polymers found to provide a suitable heat-activatable adhesive for use in connection with polyethylene. In a preferred example for white (opaque) labels, the layer compositions by weight percentages are:

EXAMPLE 5

| Top | polypropylene homopolymer | 50 |
|---|---|---|
| | ethylene-vinyl acetate copolymer | 50 |
| Central | polypropylene homopolymer | 70 |
| | ethylene-vinyl acetate copolymer | 15 |
| | titanium dioxide concentrate | 15 |
| Base | ethylene-vinyl acetate copolymer | 50 |
| | low density polyethylene | 50 |

The composition of the top and central layers of Example 5 correspond with those of Example 1, but the base layer adhesive comprises a 50/50 blend of ethylene-vinyl acetate and low density polyethylene. A suitable low density polyethylene is sold by Rexene Products Company of Dallas, Tex. under the designation PE 1017. The PE 1017 resin has a melt flow rate of 2.0 g/10 min. (ASTM 1238E), a density of 920 kg/m³ and a secant modulus of 220 MPa (ASTM 638). The remaining polymer and filler components are available as described above.

In a preferred example for clear labels, the layer compositions by weight percentage are:

EXAMPLE 6

| Top | polypropylene homopolymer | 50 |
| --- | --- | --- |
|  | ethylene-vinyl acetate copolymer | 50 |
| Central | random polypropylene copolymer | 80 |
|  | ethylene-vinyl acetate copolymer | 20 |
| Base | ethylene-vinyl acetate copolymer | 50 |
|  | low density polyethylene | 50 |

The top layer composition of Example 6 corresponds with that of Example 2, but the central layer proportion of polypropylene copolymer is increased in order to further increase the stiffness. Again, the preferred base layer composition for polyethylene containers is used in Example 6.

The antistat is omitted from the compositions of Examples 5 and 6 in favor of the use of an over-varnish applied to the printed label to protect the face side of the label and provide improved slip properties having a reduced coefficient of friction. The reduced coefficient of friction tends to correspondingly reduce the static charge build-up as labels are moved across each other during processing including label stacking and dispensing so as to eliminate or reduce the need for an added antistat agent.

It is to be noted that the compositions in the two outer layers are similar. The result is that the construction is well balanced with respect to heat-shrinkability at both sides of the construction. Such balancing of heat-shrinkability is an important concept of the invention.

As described above, the presently preferred top and base layer formulations comprise blends of olefin polymers and copolymers of olefin monomers with ethylenically unsaturated carboxylic acid or ethylenically unsaturated carboxylic acid ester comonomers such as the ethylene-vinyl acetate copolymer. The presently preferred central or core layer formulations also comprise blends of olefin polymers and copolymers of olefin monomers with ethylenically unsaturated carboxylic acid or ethylenically unsaturated carboxylic acid ester comonomers such as the ethylene-vinyl acetate copolymer.

The composition of the film layers should preferably be compatible with the container composition to enable recycle and regrindability of waste or the like during production. Also, compatible label and container compositions enable post-consumer-use recycling of the container and integral label.

As schematically illustrated in FIG. 3, the hot-stretched stock, which may be supplied in the form of the self-wound roll 39, may be printed or decorated in a printing press 40 in which the stock is subjected to mechanical and thermal stress incident to the printing itself and to the drying of the ink by exposure to heat as such or by exposure to ultraviolet radiation which tends to also generate infrared radiation.

Following printing and drying, the stock may be sheeted and stacked in a manner similar to that known for the sheeting of paper-backed label stock. Cutting is indicated by arrow G in the drawings. The severed sheets are stacked to form the stack 44. The stack may contain 100 or 200 sheets. For clarity of illustration, in the drawing the thickness of the sheets is greatly exaggerated and the stack 44 is therefore shown as made up of only a relatively small number of sheets. Each sheet in the stack is intended to provide material for several individual labels to be die-cut from the sheeted material. In the particular example described, nine labels are die-cut from each sheet. The sheets in the stack must be very accurately registered with each other so that the labels to be cut from the sheet will be formed in correct registration to the printing that appears on their face according to the pattern printed by the press 40.

If the linerless unsupported label stock is too limp, accurate stacking is prevented due to the inability to guidingly control positioning of a limp sheet by means of belts, guideways, stops or similar guiding means (not shown) with any degree of accuracy. The stiffening of the linerless stock by uniaxial hot-stretching to desired stiffnesses, as discussed more fully below, allows accurate stacking to be achieved.

Accurate stacking and subsequent handling of the sheets or labels formed therefrom is also impeded if static charges are present on the sheets or labels. The antistat present in the base layer acts to remove static charges. In the antistat used in the above examples, this action involves the creation of a very thin layer of moisture at the surface of the base layer. Even though this moisture-containing surface contacts the surface of the hot workpiece as the workpiece is formed, as more fully described below, molding of the workpiece and performance of the adhesive is not adversely affected to any detected degree by flashing of the moisture.

Figure 4:
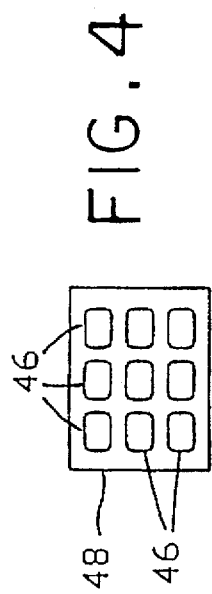
Figure 5:
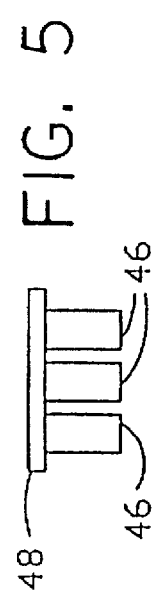
Figure 6:
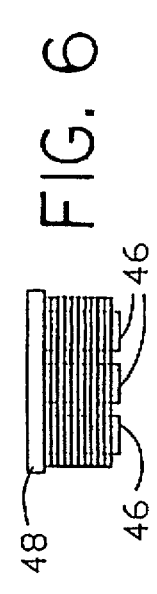
Figure 7:

Individual labels are formed in a known manner by hollow punches or cutting dies 46 carried on a head 48, seen in bottom plan view in FIG. 4 and in side elevation in FIGS. 5 and 6. The cutting dies punch out the labels from the stack 44, producing in each cutting cycle a number of stacks 50 of individual labels. In the particular example described, nine stacks of individual labels are produced in each cutting cycle.

Alternatively, following printing and drying, the stock may be fed into a rotary steel die (not shown) at the end of the printing press line and cut into labels. As the cut labels and surrounding matrix of waste material exit from the rotary steel die, the matrix is pulled away at an angle from the labels which are sufficiently stiff to continue their forward travel into a nip of a pair of feed belts (not shown) for collection into stacks 50. Thus, the machine direction stiffness is utilized in a direct label cutting and separating process which eliminates the cutting step at G as well as the other steps described with respect to FIGS. 4, 5 and 6.

The stacks 50 of individual labels are stabilized by suitable wrapping or packaging (not shown) in a manner similar to that previously used with paper-backed labels. The stabilized stacks 50 are then moved or transported to the site where the blow-molded containers are being manufactured, which often is at a different place than the site of label manufacture.

At the site of container manufacture, stacks 50 of individual labels are loaded in a dispensing magazine of a known type, schematically illustrated by magazine 54 in FIG. 8. For example, the labels may be advanced to the front of the magazine by spring means 56, and may be lightly retained for pick-off by springy or mechanically retracting retainer fingers 58. A robotic label feed head 60 carries vacuum cups 62 adapted to be advanced by means (not shown) internal to the head 60 to pick off the front label in the stack 50, retracted for translating movement of the head and the single picked-off label 50a into the opened blow mold 64 by actuation of the translating cylinder 61, and advanced again to apply the picked-off label to the interior surface of the mold and release it. The label may then be held accurately in position within the mold by vacuum applied to the mold wall through vacuum lines 66 while the label feed head 60 is retracted. The vacuum line outlets to the interior of the mold may be flush with the interior surface of the mold, as shown, so that the label occupies part of the mold cavity proper. In other words, preferably there is no recess on the interior mold surface to accommodate the label.

A hot workpiece or parison (not shown) of polyethylene or similar thermoplastic resin is fed into the mold, the mold is closed, and the parison is expanded in a known manner to complete the formation of the molded container. As the hot parison contacts the adhesive-containing base layer 14 of the label, activation of the adhesive is triggered. As indicated above, the annealing temperature of the in-mold label film should exceed the service temperature in the mold in order to avoid label shrinkage or distortion. To assure a uniform joining of the label and container, it is also desirable that the softening temperature of the in-mold label film be close to the service temperature. If, as is preferred, the label is on, not in, the interior surface of the mold, the label becomes embedded in the workpiece to which it is adhered, thus advantageously providing an inset label that is flush with the container surface and that replaces and therefore saves a portion of the charge for the molded workpiece or container without diminishing the structural integrity of the workpiece to any detected degree. As previously indicated, even though the antistat in the base layer causes the presence of moisture at the face of the base layer which must flash off upon contact of the base layer by the surface of the hot parison, the temperature of which may be say about 200 degrees F., no detected adverse affect on adhesion or molding occurs.

Other mechanisms may be employed involving rotary movement of the robotic parts. Generally, regardless of whether rotary movement is involved, the elements of such label feed mechanisms move at high speed. If the labels are too limp, they tend to flutter, interfering with proper positioning. Also, pick-off becomes unreliable because more than one label at a time may be picked off since limp labels tend to follow each other past the retainer fingers 58. The self-supporting or linerless labels must retain their dimensional and positional integrity without the benefit of a reinforcing backing.

Experience to date indicates that a minimum stiffness of about 40 Gurley in the machine direction is sufficient to accomplish this purpose and also to allow accurate sheet registration in the forming of the stack 49 at the earlier stage of manufacture illustrated in FIG. 3.

In accordance with the foregoing processing conditions, the compositions of Examples 1, 2, 3 and 4 were coextruded, hot-stretched and annealed to provide in-mold label films. The properties of the films are reported below in Table I.

TABLE I

| EXAMPLE NUMBER | | 1 | 2 | 3 | 4 | 5 | 6 |
|---|---|---|---|---|---|---|---|
| Thickness (mils) | | 4.0 | 4.0 | 4.0 | 4.5 | 4.0 | 4.0 |
| Opacity (%) | | 85.0 | 10.5 | 10.5 | 10.5 | 85.0 | 9.7 |
| Gurley Stiff. | MD | 80 | 45 | 80 | 115 | 80 | 65 |
| (mg) | CD | 35 | 20 | 35 | 50 | 35 | 30 |
| Ten. Mod. | MD | 285 | 145 | 270 | 270 | 285 | 220 |
| (1000 psi) | CD | 100 | 45 | 90 | 90 | 100 | 75 |
| Elong. (%) | MD | 45 | 55 | 45 | 45 | 45 | 44 |
| | CD | 275 | 800 | 500 | 500 | 275 | 925 |
| Ten. Str. | MD | 25.0 | 18.0 | 27.0 | 27.0 | 25.0 | 23.0 |
| (1000 psi) | CD | 2.5 | 2.2 | 3.3 | 3.3 | 2.5 | 3.5 |

Films having a composition in accordance with Examples 1 through 6 have been used for in-mold labelling of high density polyethylene containers. As described below, the printing and label converting processes are performed using conventional paper label apparatus and techniques.

The labels were printed using typical paper label printing presses, such as a Gallus press, and UV curing inks. The films were pulled through the press with a minimum force of about 20 pounds on a 6.5 inch wide web so as to impose a loading of about 3 pounds per linear inch. Even though UV curing inks are used, the ultraviolet radiation source generates heat and the temperatures in the cure portion of the press may range from ambient (e.g. about 70 degrees F.) up to about 140 to 150 degrees F. The film of Example 3 was printed using printing conditions similar to those used for paper labels. The film displayed sufficient dimensional stability to enable maintenance of printing registration and did not excessively stretch or elongate so as to otherwise prevent processing.

The printed labels were sheeted using conventional techniques as described above. The antistat in the adhesive or base layer of the films of Examples 1 through 4 effectively reduced and/or eliminated static charge problems in the handling and stacking of the cut film and labels. The over-varnish used in the films of Examples 5 and 6 similarly reduced and/or eliminated static charge problems.

The labels of Examples 1 through 6 were applied to containers using both shuttle and rotary blow-molding machines operating at typical production rates. More particularly, labels were applied using a Beckum BETM shuttle two-cavity blow-molding machine operating at a rate of about 30 containers per minute and a Graham Engineering rotary blow-molding machine operating at rate of about 60 containers per minute. In these applications, a low melt flow, high density polyethylene resin, such as that sold by Quantum Chemical under designation number 5602, was molded at a parison temperature of 390 degrees F. as measured at the barrel exit. The robotic arms automatically disposed the labels in the mold without multiple label feed and/or label folding problems. The labels adhered to the bottles along a substantially bubble free adhesion interface. Upon squeezing or deforming of the labelled bottle, the label adhered and conformed to the bottle without forming unacceptable fold or crease lines.

Referring to FIG. 9, a modified label film 100 comprises two or more laminae of multiple or single layers. The film 100 has at least one non-coextruded lamina or layer. For clarity of disclosure, corresponding layers of the label films 10 and 100 are similarly numbered by adding 100 to the reference numerals for the latter.

The label film 100 includes a coextruded multilayer film lamina 101 comprising a top face layer 112, a central or core layer 116 and an additional bottom layer 117. The bottom layer 117 may be omitted as discussed below. The bottom layer 117 of the multilayer film lamina 101 or, in the absence of such bottom layer, the exposed surface of the core layer 116, is secured to a non-coextruded adhesive-containing second film lamina or base layer 114 by extrusion coating, hot roll coating or some other suitable film combining technique with or without a tie coat.

The coextruded multilayer film lamina 101 is prepared by coextrusion through multifeed coextrusion die 18 and processed in a similar manner as the label film 10 and substantially the same processing apparatus is used as indicated in FIG. 10. The first film lamina 101 is cast "bottom layer 117 up" (i.e. with the bottom layer 117 on the upper side and the layer 112 on the lower side). Accordingly, the bottom layer 117 is conveniently facing upwardly for combination with the second film lamina or base layer 114. Of course, the first film lamina 101 may be cast in an opposite orientation and a transfer box (not shown) may be used to invert the film as is well known in the art.

The second film lamina or base layer 114 may be combined with the first film lamina 101 before, during or after processing in the MDO unit 25. In FIG. 10, the base layer 114 is shown extrusion coated onto the bottom layer 117 after processing of the film 101 in the MDO unit 25.

The multilayer film lamina 101 is stretched and stiffened in the machine direction in the MDO unit 25 in a similar manner as described above with respect to the film 10. However, the processing in the MDO unit 25 is done at higher temperatures in this embodiment to shorten the processing time since the second lamina 114 containing the heat-activatable adhesive is subsequently combined with the multilayer film lamina 101. Accordingly, the following roll temperatures are used: preheat rolls 26 and 28 (250° F.), slow draw roll 31 (260° F.), fast draw roll 32 (265° F.), and annealing roll 36 (270° F.). Thereafter, the film 101 is cooled by contact with chill roll 38 which may be at a temperature of about 140° F. If the second lamina 114 is combined with the multilayer film lamina 101 prior to processing in the MDO unit 25, the above described time-temperature-direction relationships may be employed to effect hot-stretching and annealing without activating the adhesive so as to result in sticking to the rolls.

As shown in FIG. 10, the second lamina or base layer 114 is extrusion coated using die 121 to cast the 100% solids polymeric charge of the second lamina or base layer 114 onto the bottom layer 117 of multilayer first film lamina 101 to thereby combine the second lamina with the hot-stretched and annealed first film lamina. Following the combining of the first and second laminae 101 and 114 to form the label film 100, the film is cooled with suitable chill rolls (not shown) disposed downstream of the die 121. Thereafter, the film 100 is taken up on the self-wound roll 139. Alternatively, the cooled multilayer film lamina 101 exiting from the MDO unit 25 may be wound on the roll 139 and later coated or otherwise combined with the second lamina or base layer 114.

The uniaxial hot-stretching of the multilayer film lamina 101 substantially increases stiffness in the machine direction and leaves the stock relatively flexible in the cross direction to improve conformability with a container to which it is to be applied, e.g. deformable plastic containers which are flexed during use. Uniaxial hot-stretching and annealing are also important in the development of the tensile properties necessary to the withstand the mechanical and thermal stresses of conventional paper printing processing. The useful and preferred ranges of stiffness and tensile properties noted above for the label film 10 are applicable to the label film 100 as provided in Example 7 by the hot-stretching and annealing of the multilayer film lamina 101. It should be appreciated that the second lamina or base layer 114 is relatively thin, and its omission from processing in the MDO unit 25 does not prohibit or significantly inhibit the development of the desired stiffness and tensile properties of the label film 100.

The thickness of the label film 100 is similar to that of the label film 10, and similar layer thickness ratios are applicable. The thickness of the bottom layer 117 of multilayer lamina 101 is minimized to that necessary to prevent migration of filler (e.g. titanium dioxide) from the central or core layer 116. Thus, the extruded or cast thickness of the layer 117 may be one mil or less. In cases where it is not necessary to confine a filler within the central layer, the layer 117 may be omitted so as to provide a label film 100 having a layer construction similar to that of the film 10.

The following example illustrates the use of a coextruded multilayer film lamina of non-adhesive layers which is subsequently combined with a lamina comprising an adhesive layer as described above with respect to the film 100. In this example, the coextruded non-adhesive multilayer film lamina is formed of layers having the following compositions indicated by weight percentage.

EXAMPLE 7

| Top | polypropylene homopolymer | 49 |
| --- | --- | --- |
|  | ethylene-vinyl acetate copolymer | 49 |
|  | diatomaceous earth | 2 |
| Central | polypropylene homopolymer | 44 |
|  | high density polyethylene | 20 |
|  | ethylene-vinyl acetate copolymer | 5 |
|  | talc | 26 |
|  | titanium dioxide concentrate | 5 |
| Bottom | polypropylene homopolymer | 89 |
|  | ethylene-vinyl acetate copolymer | 9 |
|  | diatomaceous earth | 2 |

The composition of the various layers in Example 7 is similar to those of Examples 1–6 in that olefin polymers and copolymers of olefin monomers with ethylenically unsaturated carboxylic acid or ethylenically unsaturated carboxylic acid ester comonomers such as ethylene-vinyl acetate copolymer are used. Herein, the central layer includes a high density polyethylene component comprising a fractional melt, film-grade resin material sold by Solvay Polymers, Inc. of Houston, Tex. An increased amount of polypropylene is used in the layer 117 for additional stiffness. The titanium dioxide filler in the core layer 116 provides the desired opaque or white color. The diatomaceous earth is an antiblocking agent.

The non-adhesive multilayer film lamina was coextruded using the above described conditions. The total thickness of the hot coextrudate was about 20 mils. The central or core layer forms the majority of the thickness of the multilayer film lamina, equal to about 80% thereof, and each of the top and bottom layers equals about 10% of the total thickness. The multilayer film lamina was hot-stretched at a 5:1 ratio and annealed using the above described conditions. The stretching of the multilayer film lamina resulted in the expected reduction in thickness and, accordingly, the thickness of the multilayer film lamina was reduced to about 4 mils.

A charge for the second lamina or base layer was prepared solely of the above described H. B. Fuller product number HM727 which is an EVA based heat-activatable adhesive. The base layer was extrusion coated onto the nonadhesive layers of the multilayer film lamina after processing in the MDO unit. The extruded thickness of the adhesive layer was about 1.3 mils.

The resulting film in accordance with Example 7 is well balanced with respect to heat-shrinkability since the compositions of the various layers are similar. The inclusion or omission of the bottom layer of the first or multilayer film lamina does not appear to affect the balance to a detectable degree. The range of useful polymeric constituents corresponds to that described above for Examples 1–6.

The properties of the film 100 are reported below in Table II.

TABLE II

| EXAMPLE NUMBER | | 7 |
| --- | --- | --- |
| Thickness (mils) | | 5.3 |
| Opacity (%) | | 83.0 |
| Gurley Stiff. | MD | 71 |
| (mg) | CD | 55 |
| Ten. Mod. | MD | 152.4 |
| (1000 psi) | CD | 78.0 |

TABLE II-continued

| EXAMPLE NUMBER | | 7 |
|---|---|---|
| Elong. (%) | MD | 42 |
| | CD | 230 |
| Ten. Str. | MD | 11.1 |
| (1000 psi) | CD | 2.1 |

Labels were prepared using the film of Example 7 and applied to containers during the molding process as in-mold labels in the same manner as in Examples 1–6. This film and resulting labels were found to perform in a satisfactory manner.

The following comparative examples illustrate the effects of various physical properties of the subject films in the label manufacture and application processes. In each of the following comparative examples, the compositions were formed into three layer films of the indicated total thickness and a 10/80/10 relative layer thickness ratio using the above described coextrusion, hot-stretching and annealing techniques to provide in-mold label films.

Comparative Example 1C

| Top | polypropylene homopolymer | 50 |
|---|---|---|
| | ethylene-vinyl acetate copolymer | 50 |
| Central | polypropylene homopolymer | 30 |
| | high density polyethylene | 33 |
| | ethylene-vinyl acetate copolymer | 15 |
| | talc | 15 |
| | titanium dioxide | 7 |
| Base | polypropylene homopolymer | 50 |
| | ethylene-vinyl acetate copolymer | 50 |

A 3.5 mil thick in-mold label film of the composition of Comparative Example 1C had a machine direction Gurley stiffness value in the range of from about 40 to about 48. Due to the relatively low Gurley stiffness values and the absence of an antistat component, the handling characteristics of this film were not entirely satisfactory during sheeting and the cut film did not uniformly stack since the relatively limp cut film pieces did not easily slide over each other and such movement was impeded by any static charges present. For similar reasons, labels formed from this film and used in a Graham Engineering rotary blow-molding machine in the above described manner did not dispense satisfactorily in that the label tended to fold and/or flap as it was placed in the mold. Further, the base layer failed to stick to a high density polyethylene container.

Comparative Example 2C was the same as Comparative Example 1C except that it had a total film thickness of 4 mils and the base layer composition was as follows: polypropylene homopolymer (50), ethylene-vinyl acetate copolymer (25), and heat activatable adhesive (25). The film of Comparative Example 2C had a Gurley value of about 60, and it satisfactorily sheeted and dispensed when processed in a manner similar to Comparative Example 1C. However, there was a lack of adhesion sufficient to affect label and container conformability. The adhesion deficiencies are indicated by bubbles along the adhesion interface between the container and adjacent label base surface. Comparative Example 3C included modification of the base layer formulation to that of Examples 1–3 herein and achievement of satisfactory adhesion and static charge properties. This film had a machine direction Gurley stiffness value of about 60. The film displayed satisfactory film processing characteristics and resulted in labels having acceptable adhesion and conformability properties when applied to high density polyethylene containers. However, surface mottling possibly due to water absorption by the talc was observed.

Comparative Example 4C comprised a modification of the formulation of Comparative Example 3C wherein polypropylene homopolymer was substituted for the talc component. Surprisingly, an additional increase in Gurley from about 60 to about 80 was attained. This additional stiffness is believed beneficial.

As shown in Tables I and II, uniaxial stretching provides the films of Examples 1–7 with dimensional stability to enable linerless processing thereof. More particularly, the uniaxial stretching techniques of the invention tend to stabilize the film and facilitate linerless film processing as, for example, label printing using conventional printing presses as illustrated above. The relatively low elongation values at break and the high tensile modulus values in the machine direction are believed to characterize acceptable dimensional stability of the film correlating to the stretching techniques of the invention.

Referring to Table III below, Comparative Examples 5C and 6C comprise commercially available in-mold label film. These films are believed to comprise multilayer coextruded polyolefin constructions of primarily medium density polyethylene.

TABLE III

| Comparative Example Number | | 5C | 6C |
|---|---|---|---|
| Thickness (mils) | | 4.5 | 4.5 |
| Opacity (%) | | 12.5 | 78.0 |
| Gurley Stiffness | MD | 45 | 55 |
| (mg) | CD | 55 | 60 |
| Tensile Modulus | MD | 65 | 65 |
| (1000 psi) | CD | 70 | 75 |
| Elongation (%) | MD | 950 | 850 |
| | CD | 1150 | 1050 |
| Tensile strength | MD | 3.2 | 2.6 |
| (1000 psi) | CD | 2.9 | 2.7 |

As indicated by the stiffness, tensile and elongation properties, it is not believed that the films of Comparative Examples 5C and 6C are hot-stretched as in the present invention. However, the films of Comparative Examples 5C and 6C may be imparted with a limited degree of melt orientation during the coextrusion process. The limited orientation, if any, of these films results in relatively low tensile modulus and elongation properties in the machine direction which are believed to be associated with the printing problems encountered with such films. More particularly, films in accordance with Comparative Examples 5C and 6C tend to elongate excessively during printing upon application of press tension and temperature conditions described above so as to prevent or substantially inhibit maintenance of print registration and film handling by conventional printing techniques. Thus, it is believed that linerless film processing of in-mold film using conventional printing techniques requires a machine direction tensile modulus greater than about 65,000 psi and/or an elongation at break less than about 850%.

While the invention has been illustrated and described with respect to the in-mold labelling of blow-molded containers, the invention may be directly applied and its benefits may be directly enjoyed in other thermal forming techniques such as injection molding, thermoforming and sheet molding compound forming when used to form a container or substrate against a mold wall having a label or other film (e.g. decorative film) positioned thereon.

In the application of the time-temperature-direction conditions of the invention to labels or other film stock, it should be understood that the heat energy for hot-stretching and annealing may be provided by conventional film processing apparatus such as heated rolls as described above (with oil or radio frequency heating) as well as infrared heat sources such as infrared heat lamps, and combinations thereof, as are well known in the art. The time-temperature-direction conditions of the invention may be used in connection with all such heating techniques.

It should be evident that this disclosure is by way of example, and that various changes may be made by adding, modifying or eliminating details without departing from the fair scope of the teaching contained in this disclosure. The invention therefore is not limited to particular details of this disclosure except to the extent that the following claims are necessarily so limited.

What is claimed is:

1. A blow molded plastic container having an in mold label formed of an oriented polymeric in-mold label film comprising first and second laminae which provide said film with a top layer at a face side of the film and a base layer at a back side of the film, said top layer being ink-printable and said base layer comprising a heat-activatable adhesive, at least said first lamina being hot-stretched and annealed, said first and second laminae being combined to form said film as a linerless self-wound film, and heat shrinkability at each side of the film being balanced to a sufficient extent to limit curling of the film, said wound film being unwindable and processable, as a free self-supporting dimensionally stable film, through a printing press, heat-generating ink drying means, and die-cutting means.

2. A container as in claim 1, wherein said top layer and said base layer each contain a major proportion comprising a blend of a polypropylene polymer and a copolymer of an ethylene monomer with an ethylenically unsaturated carboxylic acid or an ethylenically unsaturated carboxylic acid ester comonomer.

3. A container as in claim 1, wherein said top layer and said base layer each contain more than 50% by weight of a blend of a polypropylene polymer and an ethylene-vinyl acetate copolymer.

4. A container as in claim 1, wherein said film has a machine direction Gurley stiffness value in the range of from about 40 to about 130 and a cross direction Gurley stiffness value in the range of from about 20 to about 65.

5. A container as in claim 1, wherein said film has a machine direction tensile modulus value greater than about 65,000 psi.

6. A container as in claim 1, wherein said film has a machine direction Gurley stiffness value greater than about 40.

7. A container as in claim 1, wherein said film has a machine direction elongation at break less than about 850%.

8. A container as in claim 7, wherein said film has a sufficiently high tensile modulus and stiffness value in the machine direction to enable it to withstand the mechanical and thermal stresses of conventional printing processes including film tension loads of about three pounds per linear inch of film width at temperatures ranging from about 70 degrees F. to about 150 degrees F.

9. A container as in claim 1, wherein said base layer of said film includes an antistat agent.

10. A container as in claim 1, wherein said container is formed of a polyolefin and said top layer and said base layer of said film each contain a major proportion comprising a blend of an olefin polymer and a copolymer of an olefin monomer with an ethylenically unsaturated carboxylic acid or an ethylenically unsaturated carboxylic acid ester comonomer.

* * * * *